(12) United States Patent  
Szyszko

(10) Patent No.: US 7,237,113 B2  
(45) Date of Patent: Jun. 26, 2007

(54) KEYED AUTHENTICATION ROLLOVER FOR ROUTERS

(75) Inventor: Jacek Szyszko, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 1284 days.

(21) Appl. No.: 09/734,834

(22) Filed: Dec. 11, 2000

(65) Prior Publication Data

US 2002/0071430 A1 Jun. 13, 2002

(51) Int. Cl.  
*H04L 9/08* (2006.01)

(52) U.S. Cl. .................. 713/171; 713/153; 713/168

(58) Field of Classification Search .............. 705/26, 705/51, 59, 75, 76; 380/45, 277, 278, 43; 713/168, 153, 171  
See application file for complete search history.

(56) References Cited

U.S. PATENT DOCUMENTS 6,301,662 B1 * 10/2001 Hardjono ............... 713/176  
6,363,149 B1 * 3/2002 Candelore ............... 380/45  
6,606,706 B1 * 8/2003 Li ............................ 713/162  
6,611,812 B2 * 8/2003 Hurtado et al. ............ 705/26

OTHER PUBLICATIONS

OSPF Version 2, Network Workign Group Request for Comments 2328 Apr. 1998, (244 pages).*  
R. Rivest, "The MD4 Message-Digest Algorithm", MIT Laboratory for Computer Science and RSA Data Security, Inc., Apr. 1992.  
R. Rivest, "The MD5 Message-Digest Algorithm", MIT Laboratory for Computer Science and RSA Data Security, Inc., Apr. 1992.  
F. Baker et al., "RIP-2 MD5 Authentication", Cisco Systems, Jan. 1997.  
G. Malkin, "RIP Version 2", Bay Networks, Nov. 1998.

* cited by examiner

*Primary Examiner*—Kambiz Zand  
*Assistant Examiner*—Ellen C. Tran  
(74) *Attorney, Agent, or Firm*—Fish & Richardson P.C.

(57) ABSTRACT

Transmitting routing information includes sending first and second messages from a router. The first message includes a digest of the routing information using a first authentication key and a first sequence identifier. The second message, which is sent after the first message, includes a digest of the routing information using a second authentication key and a second sequence identifier that is earlier in a sequence than the first sequence identifier.

30 Claims, 6 Drawing Sheets

KEYED AUTHENTICATION ROLLOVER FOR ROUTERS

BACKGROUND

The invention relates to keyed authentication rollover for routers.

Large networks such as the Internet can be organized into smaller networks connected by special purpose gateways known as routers. Hosts and routers, for example, are presented with Internet Protocol (IP) datagrams addressed to a particular host. Routing is a technique by which the host or router decides where to send the datagram.

Various routing protocols are available to supply the information required to perform the routing. For example, Routing Information Protocol (RIP) routers can exchange topology information with one another. The topology information defines ways to traverse through networks. Other devices, such as servers and workstations, may be connected to the network.

In general, it is important to reduce the likelihood that false protocol messages will be received and processed by the routers. Routers can use various techniques to protect themselves against such attacks. Exemplary algorithms include Message Digest version 4 (MD4) or version 5 (MD5) algorithms which use encryption-specific one-way hash functions. According to the MD5 algorithm, for example, the routers store a secret key that is used to calculate a message digest of the routing information placed in each packet. Further details of the MD4 and MD5 algorithms are described in (1) R. Rivest, "The MD5 Message-Digest Algorithm," MIT Laboratory for Computer Science and RSA Data Security, Inc., Network Working Group, Request for Comments, RFC 1321 (April 1992) and (2) R. Rivest, "The MD4 Message-Digest Algorithm," MIT Laboratory for Computer Science and RSA Data Security, Inc., Network Working Group Request for Comments, RFC 1320 (April 1992).

To increase security, it is desirable to change the keys periodically. However, it is important that the routers pass information without interruption even if neighboring routers are not simultaneously configured with the new key.

DETAILED DESCRIPTION

Figure 1:
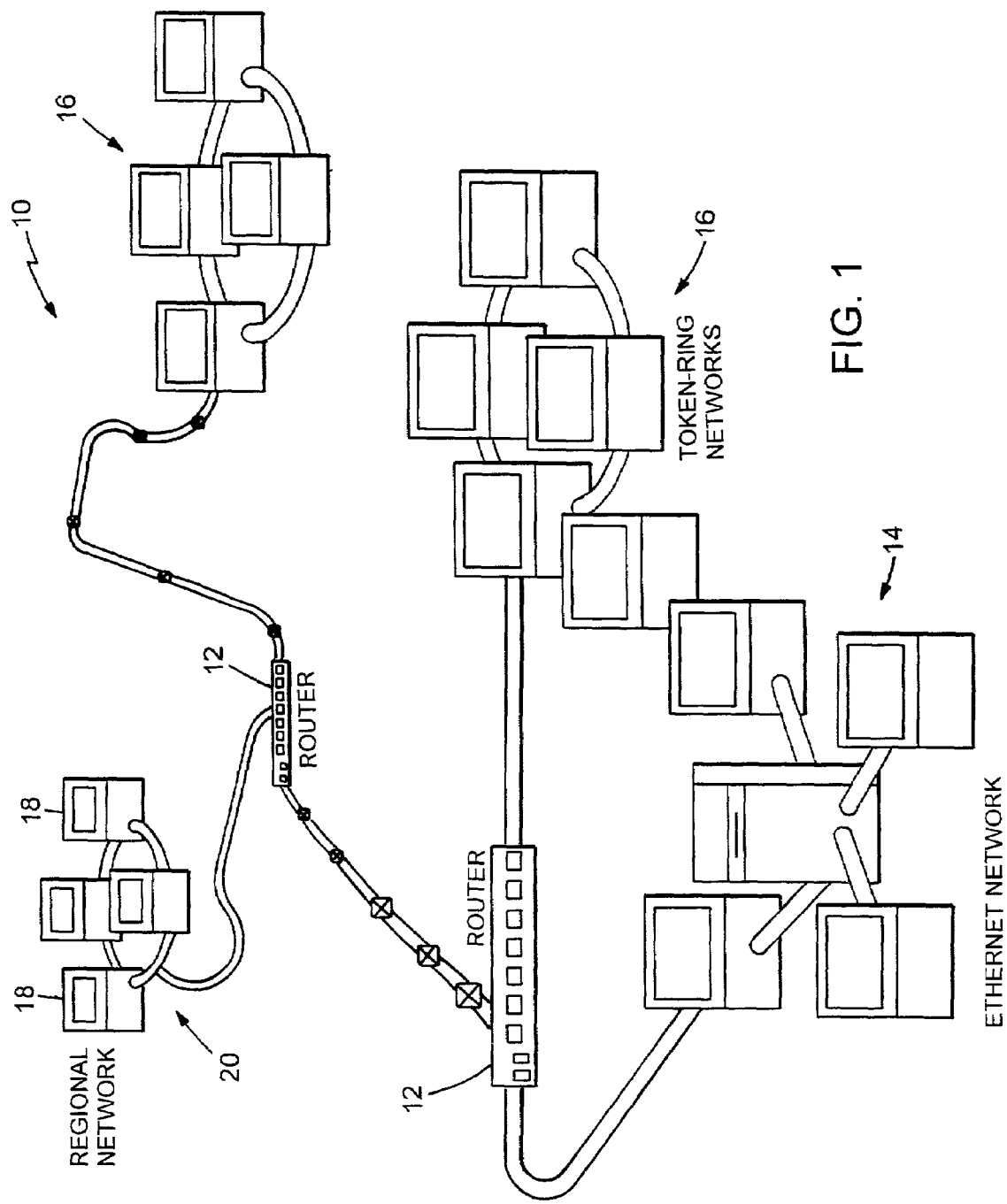
FIG. 1 shows a network.

As illustrated in FIG. 1, an exemplary computer network 10 such as the Internet can include multiple smaller networks connected by routers 12. Smaller networks can include, for example, Ethernet networks 14 and Token-ring networks 16. Networks 18 in a particular geographic area can be connected into a large regional network 20. Other routers (not shown) can pass the information between networks within that area.

Each router 12 has one or more interfaces establishing connections to other routers or networks. Packets are received at input ports and are transmitted from output ports associated with the interfaces. A router 12 examines a received packet of data traveling across the Internet to determine the packet's destination, and the packet is routed from one router 12 to the next until the packet reaches its destination. Each router maintains a routing table that indicates how to send packets to various destinations. A processor in each router 12 can execute the algorithm discussed below.

Each router 12 can send an advertisement to neighboring routers to inform the neighboring routers of its current routing information. The advertisement can be broadcast or multicast to the neighboring routers and can include one or more routing messages, each of which includes network addresses, cost matrix information or other routing information. The advertisements can be sent on a periodic or other basis. Prior to sending a particular routing message, the router calculates a digest of the routing information using a secret authentication key. The message digest then is transmitted as part of the routing message. The receiving router also uses the authentication key to calculate a digest based on the received routing message and compares its digest to the received digest to authenticate the validity of the received routing message.

Each routing message is assigned a sequence identifier, such as a number, that also is transmitted as part of the routing message. Following receipt of an initial routing message, a particular router will accept a subsequent routing message only if the sequence number of the later message is higher than the sequence number of the previous routing message.

In one implementation, the MD5 algorithm is used to encrypt the routing information, although other algorithms can be used alternatively. Each authentication key is assigned a unique identification and a lifetime, in other words, a time interval during which the key is generally considered to be valid. The authentication key identification can include, for example, a number or other character string. Each key should become valid at a time that differs from the time that any other key on the particular interface becomes valid so that the keys can be sorted by their respective ages.

The authentication keys and the corresponding lifetimes can be established, for example, by a network administrator. The routers 12 store the keys locally. The keys periodically can be changed by the administrator. For example, the administrator may change the encryption keys once a week, once a month, or according to some other schedule. To limit the amount of administrative overhead required, each router interface can be configured to manage more than one key. Network Time Protocol (NTP) can be used to synchronize the routers' internal clocks so that, ideally, all neighboring routers 12 begin using a new key at the same time. The keys used on different interfaces for a particular router 12 can be identical or may differ.

Figure 2A:
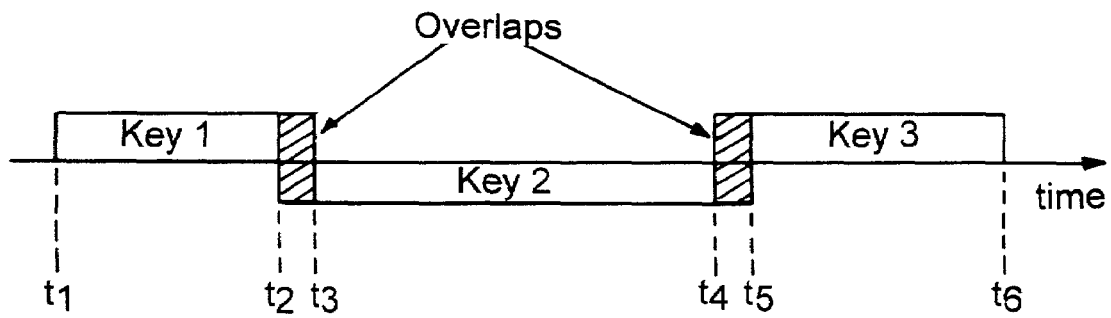
FIGS. 2A and 2B illustrate exemplary encryption key lifetimes.
Figure 2B:
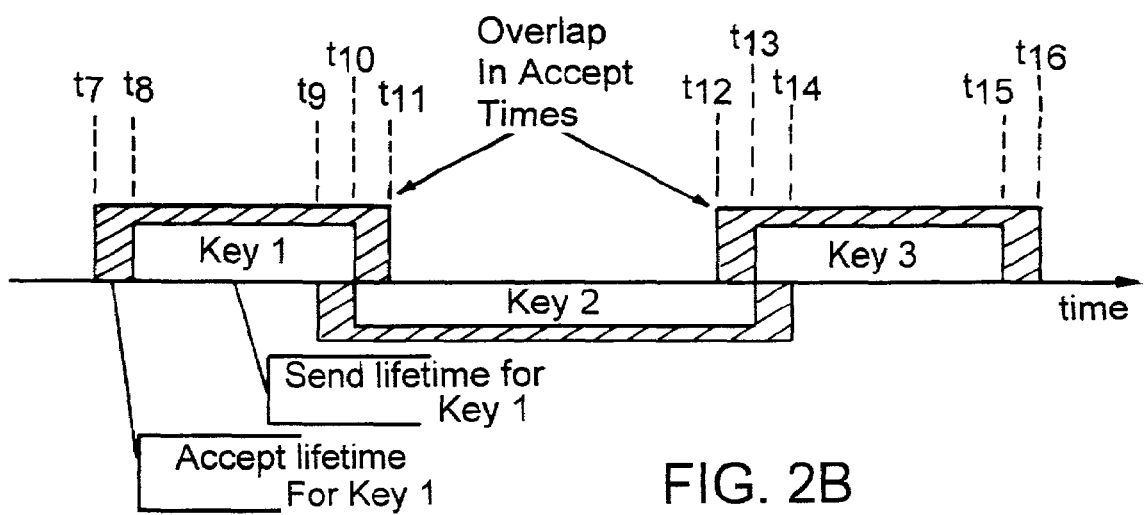

FIGS. 2A and 2B illustrate alternative ways for specifying the lifetimes for the authentication keys. As shown in FIG. 2A, three keys (Key1, Key2, Key3) are valid during respective time intervals. For example, Key1 is valid during the interval from time $t_1$ until the time $t_3$. Similarly, Key2 is valid during the interval from time $t_2$ until the time $t_5$. Key 3 is valid during the interval from time $t_4$ until the time $t_6$. In such a situation, there are overlapping periods (indicated by the hatched areas in FIG. 2A) in which a new key and the previous key are both valid. Furthermore, a single time interval defines the validity of the key at a transmitting router as well as at a receiving router.

FIG. 2B also shows time intervals during which three keys (Key1, Key2, Key3) are valid. In this scenario, however, different intervals are used to indicate the times when a particular key is valid for use with transmitting routing information and for use with received routing information. For example, Key1 is valid for sending routing information from time $t_8$ until time $t_{10}$, whereas that key is valid for accepting routing information from time $t_7$ until $t_{11}$. In the implementation shown in FIG. 2B, the accept interval (hatched area) for Key1 begins before the send interval (non-hatched area) for that key and extends beyond the end of the send interval. Key2 is valid for sending routing information from time $t_{10}$ until time $t_{13}$, whereas that key is valid for accepting routing information from time $t_9$ until $t_{14}$. Similarly, Key3 is valid for sending routing information from time $t_{13}$ until time $t_{15}$, whereas that key is valid for accepting routing information from time $t_{12}$ until $t_{16}$. Thus, as shown in FIG. 2B, the send time interval for a particular key begins substantially at the same time that the send time for the previous key ends. On the other hand, the accept times for sequential keys partially overlap, such that the end of the accept time for a particular key overlaps with the beginning of the accept time for the next key.

Figure 3:
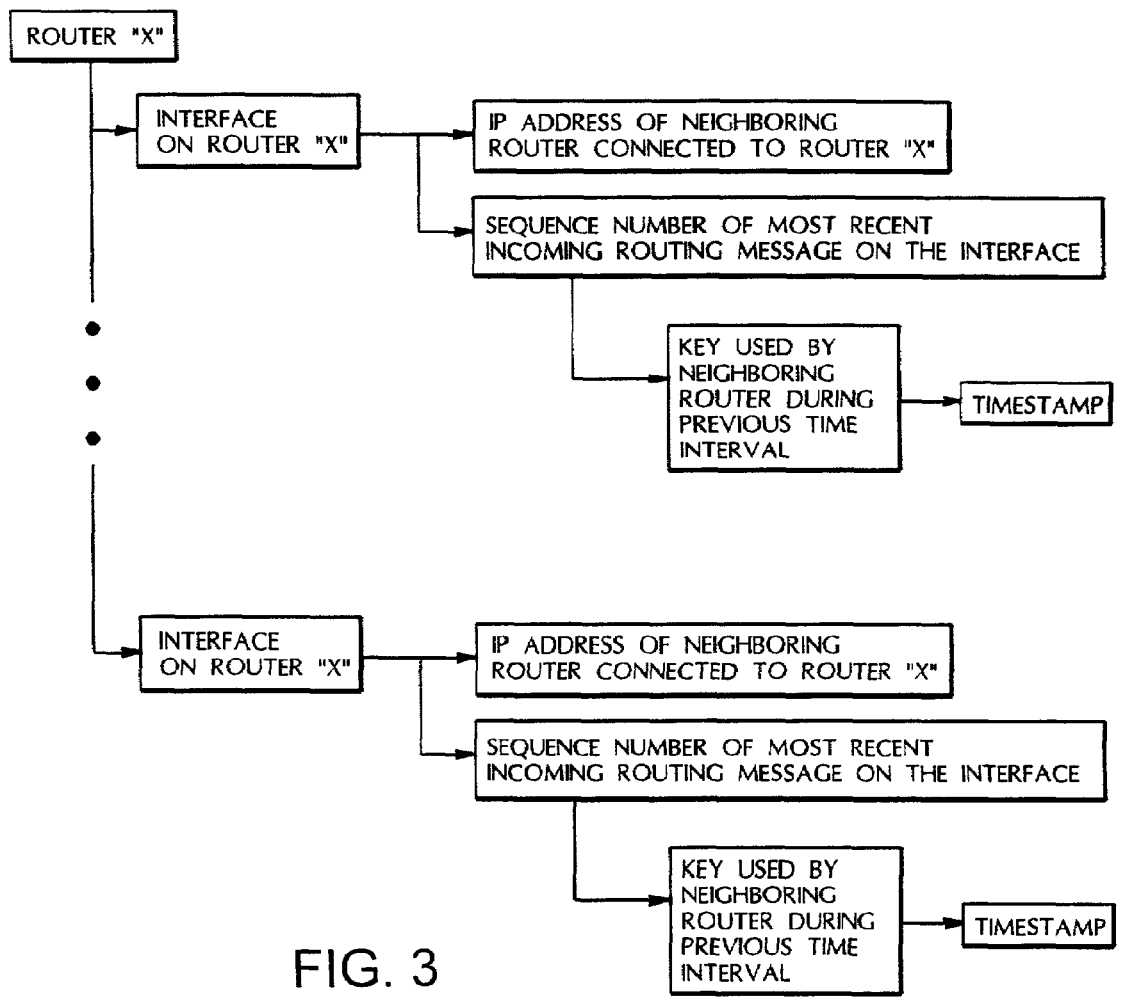
FIG. 3 illustrates exemplary information that is stored in memory associated with a router.

As shown in FIG. 3, each router 12 maintains a table of neighboring routers for each of its interfaces. Each neighboring router is identified, for example, by its Internet Protocol (IP) address. Each router also stores the key identification for the last message accepted from each neighboring router 12. A timestamp indicates the most recent time a message received from the neighboring router was authenticated. Additionally, each router 12 maintains a record of the sequence number identifying the most recently received routing message from each neighboring router. When an authentication key rollover occurs, each router 12 stores the new key identifier in its database.

Figure 4:
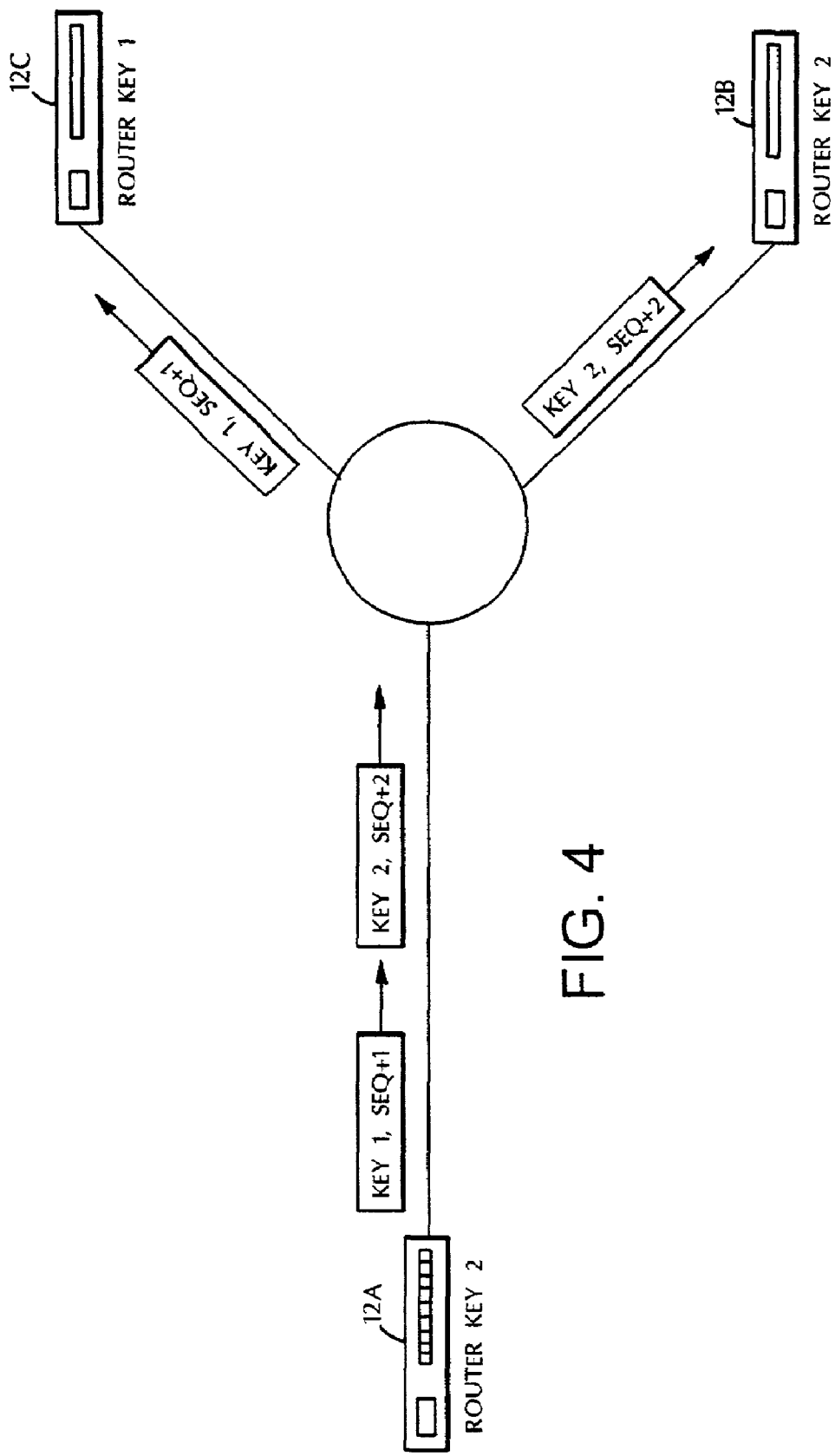
FIG. 4 illustrates an exemplary transmission of routing messages according to the invention.
Figure 5:
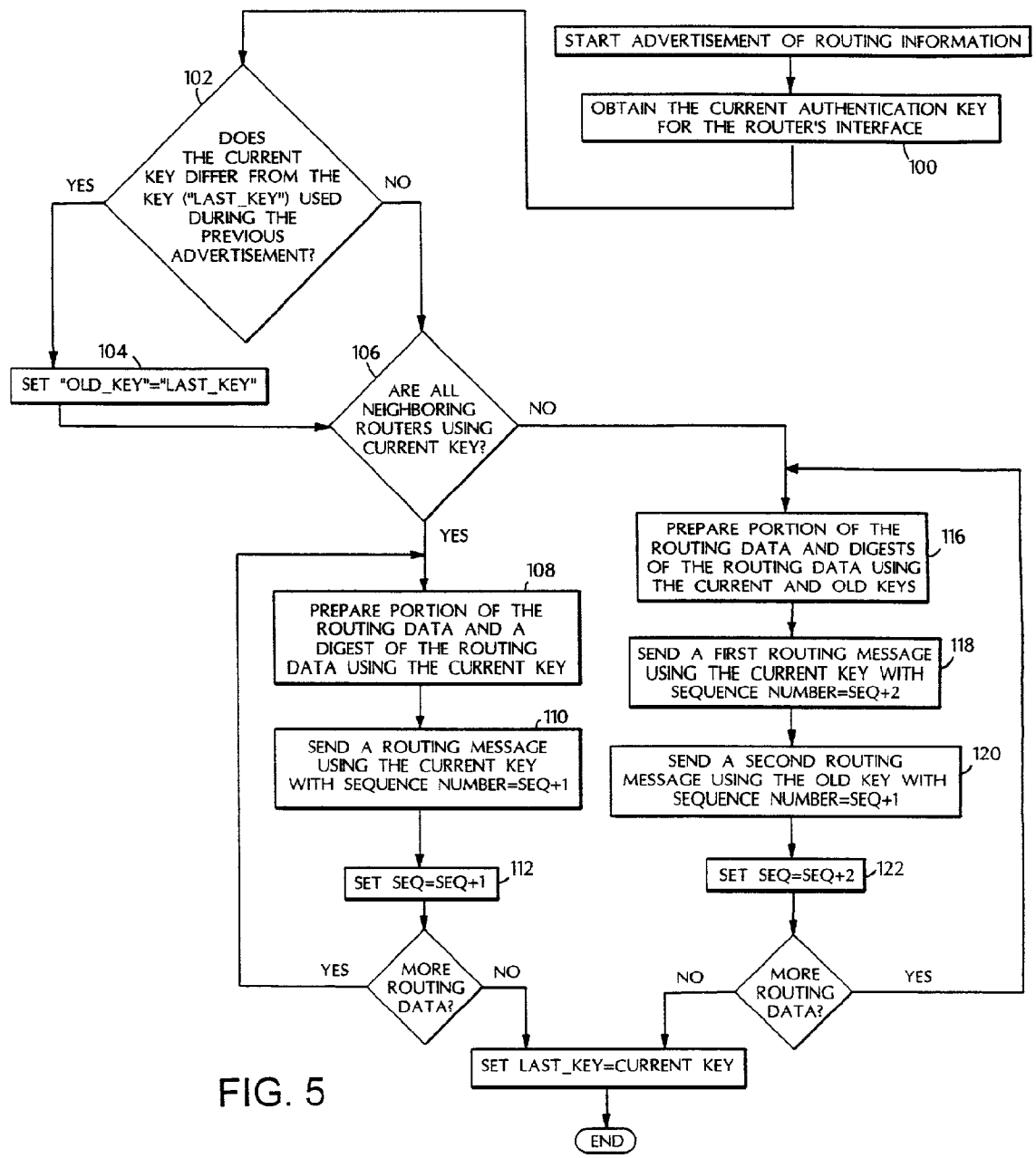
FIG. 5 is a flow chart of a method according to the invention.

When a particular router, such as the router 12A (FIG. 4), prepares to send an advertisement about its routing information over a particular interface, it executes the algorithm illustrated by the flow chart of FIG. 5. The interfaces on a particular router 12 can send advertisements independently of one another and need not be synchronized. Initially, the router 12A obtains 100 the current authentication key for the router's interface from its database. The router 12A then determines 102 whether the current key differs from the key used during the previous advertisement for that interface. If the keys differ, then an authentication key rollover has occurred since the last advertisement. A software variable ("old_key") is set 104 to the value of the key used during the previous advertisement ("last_key"). If the determination in block 102 indicates that the keys are the same, then an authentication key rollover has not occurred since the last advertisement. In either situation, the algorithm continues with block 106 in which the router 12A determines whether all the neighboring routers are configured to use the current key. The determination can be made by reviewing the information stored in the router's table (FIG. 3) and checking the key identifier used in the most recent message accepted from each neighboring router.

If the router 12A determines that all the neighboring routers are configured to use the current key, then the router prepares 108 a particular segment of the routing data and a digest of the segment of the routing data using the current key. The router 12A then sends 110 a message 40 (FIG. 6) that includes a header 42, the particular segment of the routing data 44, the digest 46 of the routing data, the authentication key identification 48 and a sequence number 50. The value of the sequence number for the previous routing message sent by the router 12A over the particular interface is indicated by a variable "SEQ." Thus, the value of the sequence number for the current routing message is set to "SEQ+1." The value of the variable SEQ then is incremented 112 by one. The cycle of blocks 108, 110 and 112 is continued until all the routing data for the current advertisement has been sent by the router 12A.

After routing messages corresponding to all the routing data have sent to the neighboring routers, a variable "last_key" that identifies the key used during the previous advertisement is set 114 to the current key.

If (in block 106) the router 12A determines that one or more neighboring routers still are using the old key, then the router 12A prepares 116 a particular segment of the routing data and digests of the segment of the routing data. One digest is calculated using the current key, whereas a second digest is calculated using the old key.

Figure 6:
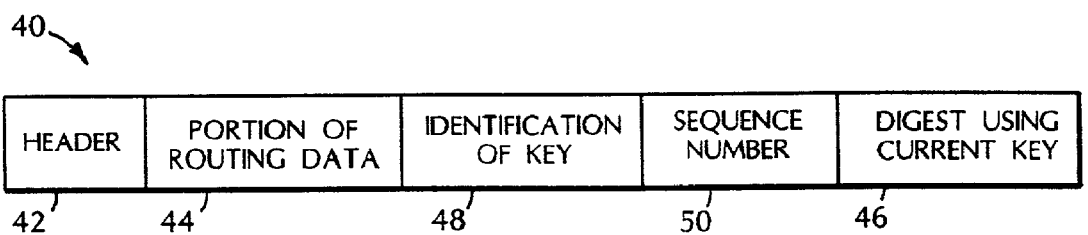
FIG. 6 illustrates an exemplary format of a routing message.
Figure 7A:
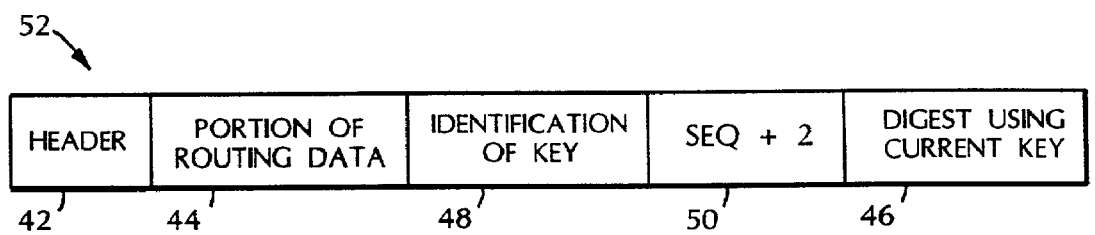
FIGS. 7A and 7B illustrate routing messages according to an exemplary scenario.
Figure 7B:
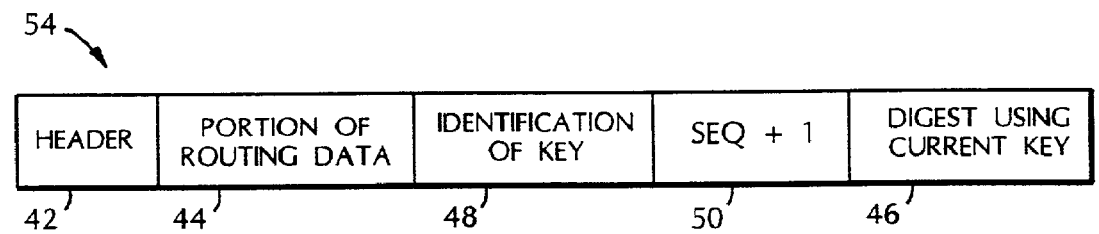

The router 12A sends 118 a first routing message 52 (FIG. 7A) with a format similar to the format of the message 40 shown in FIG. 6. In the first message 52, the digest 46 of the routing data is calculated using the current key and the sequence number 50 for the message is set to "SEQ+2." The router 12A then sends 120 a second routing message 54 (FIG. 7B). In the second message 54, the digest of the routing data is calculated using the old key and the sequence number 50 is set to "SEQ+1." The value of the variable SEQ then is incremented 122 by two. The cycle of blocks 116, 118, 120 and 122 is continued until all the routing data for the current advertisement has been sent by the router 12A. After routing messages corresponding to all the routing data have sent to the neighboring routers, the variable "last_key" that identifies the key used during the previous advertisement is set 114 to the current key.

As indicated by the foregoing discussion, the first routing message 52 prepared using the current key is identified with a sequence number that is higher than the sequence number used to identify the routing message 54 prepared with the old key. FIG. 4 illustrates an exemplary scenario assuming that the previous key is Key1, that the current key is Key2, and that the last routing message sent by the router was identified by the sequence number "N." In that case, the first routing message (prepared with Key2) would be identified by the sequence number "N+2," and the second routing message (prepared with Key1) would be identified by the sequence number "N+1." By sending the first message 52 prior to the second message 54, the amount of processing overhead that must be performed by the receiving routers can be reduced.

In the discussion that follows, it is assumed, for purposes of illustration, that the router 12B (FIG. 4) has successfully performed the new key rollover, but that the router 12C has not yet performed the new key rollover. In such a situation, the transmitting router 12A sends each routing messages twice—first using the new key (Key2) and then using the old key (Key1). The router 12A is configured to be capable of transmitting routing messages authenticated with the old key even though the normal transmission lifetime for the old key, as indicated by FIG. 2A or 2B, may have expired.

A receiving router 12B, 12C will ignore a message if the sequence number associated with the message is not greater than the sequence number of the most recent message processed by that particular router. Furthermore, a receiving router is unable to process a routing message if the identification of the authentication key for the message differs from the authentication key expected by the receiving router.

Using the example illustrated in FIG. 4, when the router 12C receives a routing message with the new key (Key2), it cannot process the message because the authentication key identification 48 differs from the identification of the key that router 12C expects. That router, however, can accept and process the second message because its sequence number (N+1) is greater than the sequence number (N) of the previously processed message and because the authentication key identification corresponds to the expected key. In contrast, the router 12B accepts the first message with the new key (Key2) because its sequence number (N+2) is greater than the sequence number (N) of the previously processed message and because the authentication key identification corresponds to the expected key. That router, however, will not process the routing information in the second message because the sequence number (N+1) of the second message is less than the sequence number (N+2) of the routing message most recently accepted and processed by that router. Therefore, the router 12B can avoid processing the second message, thereby reducing the total processing overhead.

The foregoing techniques can help alleviate problems that may arise when the routers' internal clocks are not perfectly synchronized and/or network management errors occur.

In some situations, it may be desirable for a transmitting router to transmit routing messages using only the new authentication key, even though the transmitting router determines that some of the neighboring routers are not yet using the new key. After the router is powered up, for example, the router will not contain the old key. Therefore, routing messages in the first advertisement after the router is powered up can be sent using only the new key.

Similarly, routing messages in the first advertisement after occurrence of an authentication key rollover can be sent using only the new key. One rationale for sending routing messages with only the new key in that case can be understood by considering a situation in which there is substantially perfect synchronization among the routers' internal clocks and all neighboring routers rollover to a new key at the same time. In that case, when a particular router is preparing to transmit its next advertisement, it will be unaware that the neighboring routers also have been configured successfully to use the new key. Sending each routing message twice—once with the new key and then with the old key—would be unnecessary. Therefore, in some implementations, the routers 12 are configured not to execute the cycle of blocks 116, 118, 120 and 122 with respect to routing messages that are transmitted as part of the first advertisement following a successful authentication key rollover.

The foregoing techniques can be particularly advantageous when used, for example, with RIP routers described in C. Hedrick, "Routing Information Protocol," STD 34, RFC 1058, Rutgers University (June 1988). However, the techniques can be used with other routers as well.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM), that is readable by a general or special purpose programmable computer, for configuring and operating the computer when the storage medium is read by the computer to perform the functions described above.

Other implementations are within the scope of the following claims.

What is claimed is:

1. A method of transmitting routing information comprising:
   sending a first message containing a first sequence identifier and a digest of routing information that has been calculated using a first authentication key; and
   subsequently sending a second message containing a second sequence identifier that is earlier in a sequence than the first sequence identifier and a digest of the routing information that has been calculated using a second authentication key;
   wherein the second sequence identifier is sequentially related to the first sequence identifier.

2. The method of claim 1 wherein each authentication key has a specified lifetime and the lifetime of the second key expires prior to the lifetime of the first key.

3. The method of claim 1 wherein the first key is valid only following an authentication key rollover and the second key was valid at a time prior to the authentication key rollover.

4. The method of claim 3 including:
   determining whether neighboring routers have successfully performed the authentication key rollover; and
   sending both the first and second messages only if it is determined that at least one neighboring router has not yet successfully performed the authentication key rollover.

5. The method of claim 4 including sending only the first message if the first message forms part of a routing information advertisement that is the first such advertisement transmitted by the router after the authentication key rollover.

6. The method of claim 3 including sending only the first message if it is determined that all neighboring routers have successfully performed the authentication key rollover.

7. The method of claim 3 including:
   receiving the first and second messages in a particular neighboring router; and
   processing, in the particular neighboring router, only the digest contained in the first message.

8. The method of claim 3 wherein the first sequence identifier comprises a number greater than the second sequence number.

9. A router comprising:
   a port; and
   a processor configured for sending a first message and a second message over the port to a neighboring router, and configured for sending the first message prior to the second message,
   wherein the first message contains a first sequence identifier and a digest of routing information that has been calculated using a first authentication key,
   wherein the second message contains a second sequence identifier that is earlier in a sequence than the first sequence identifier and a digest of the routing information that has been calculated using a second authentication key, and
   wherein the second sequence identifier is sequentially related to the first sequence identifier.

10. The router of claim 9 wherein the processor is configured for sending both the first and second messages only if the router determines that fewer than all of its neighboring routers have successfully performed an authentication key rollover.

11. The router of claim 10 wherein the processor is configured for using as the first key a key that is valid only following the authentication key rollover and to use as the second key a key that was valid at a time prior to the authentication key rollover.

12. The router of claim 10 wherein the processor is configured for sending only the first message if the first message forms part of a routing information advertisement, and the routing information advertisement is the first such advertisement transmitted by the router after the authentication key rollover.

13. The router of claim 10 wherein the first sequence identifier comprises a number greater than the second sequence number.

14. A computer system comprising:
   a plurality of computer networks;
   a first router interconnecting at least some of the computer networks; and
   neighboring routers coupled to the first router,
   wherein the first router is configured for periodically sending respective first and second messages to one or more of the neighboring routers, and for sending the first message prior to the second message,
   wherein the first message contains a first sequence identifier and a digest of routing information that has been calculated using a first authentication key,
   wherein the second message contains a second sequence identifier that is earlier in a sequence than the first sequence identifier and a digest of the routing information that has been calculated using a second authentication key, and
   wherein the second sequence identifier is sequentially related to the first sequence identifier.

15. The system of claim 14 wherein the first router is configured for sending both the first and second messages only if the first router determines that fewer than all of the neighboring routers have successfully performed an authentication key rollover.

16. The system of claim 15 wherein each neighboring router that receives the first and second messages is configured for:
   processing the first message using the first authentication key and discarding the second message without processing the routing information contained therein if that neighboring router has successfully performed the authentication key rollover, and
   processing the second message using the second authentication key if that neighboring router has not successfully performed the authentication key rollover.

17. The system of claim 15 wherein the first router is configured for using as the first authentication key a key that is valid only following the authentication key rollover and for using as the second authentication key a key that was valid at a time prior to the authentication key rollover.

18. The system of claim 15 wherein the first router is configured for sending only the first message if the first message forms part of a routing information advertisement that is the first such advertisement transmitted by the first router after the authentication key rollover.

19. The system of claim 15 wherein the first sequence identifier comprises a number greater than the second sequence number.

20. An article comprising computer-readable medium storing computer-executable instructions for causing a router to:
   send a first message containing a first sequence identifier and a digest of routing information that has been calculated using a first authentication key, and
   subsequently send a second message containing a second sequence identifier that is earlier in a sequence than the first sequence identifier and a digest of the routing information that has been calculated using a second authentication keys,
   wherein the second sequence identifier is sequentially related to the first sequence identifier.

21. The article of claim 20 wherein the first key is valid only following an authentication key rollover and wherein the second key is valid at a time prior to the authentication key rollover.

22. The article of claim 21 including instructions for causing the router to:
   determine whether neighboring routers have successfully performed the authentication key rollover, and
   send both the first and second messages only if it determined that at least one neighboring router has not yet successfully performed the authentication key rollover.

23. The article of claim 22 including instructions for causing the router to send only the first message if the first message forms part of a routing information advertisement that is the first such advertisement transmitted by the router after the authentication key rollover.

24. The article of claim 22 including instructions for causing the router to send only the first message if it is determined that all neighboring routers have successfully performed the authentication key rollover.

25. A method for use in connection with a router comprising:
   receiving in the router a first message containing a first sequence identifier and a digest of routing information that has been calculated using a first authentication key;
   subsequently receiving in the router a second message containing a second sequence identifier that is earlier in a sequence than the first sequence identifier and a digest of the routing information that has been calculated using a second authentication key; and
   processing the first message using the first authentication key and discarding the second message without processing routing information contained therein if the router has successfully performed an authentication key rollover from the second key to the first key;
   wherein the second sequence identifier is sequentially related to the first sequence identifier.

26. The method of claim 25 including processing the second message using the second key only if the router has not successfully performed the authentication key rollover.

27. A router comprising:
   a port; and
   a processor configured for:
      receiving a first message containing a first sequence identifier and a digest of routing information that has been calculated using a first authentication key,
      subsequently receiving a second message containing a second sequence identifier that is earlier in a sequence than the first sequence identifier and a digest of the routing information that has been calculated using a second authentication key, wherein the second sequence identifier is sequentially related to the first sequence identifier, and processing the first message using the first key and discarding the second message without processing routing information contained therein if the router has successfully performed an authentication key rollover from the second key to the first key.

28. The router of claim 27 wherein the processor is configured for processing the second message using the second key only if the router has not successfully performed the authentication key rollover.

29. An article comprising computer-readable medium storing computer-executable instructions for causing a router to:

receive a first message containing a first sequence identifier and a digest of routing information that has been calculated using a first authentication key;

subsequently receive a second message containing a second sequence identifier that is sequentially related to the first sequence identifier and earlier in a sequence than the first sequence identifier and a digest of the routing information that has been calculated using a second authentication key; and process the first message using the first key and discard the second message without processing routing information contained therein if the router has successfully performed an authentication key rollover from the second key to the first key.

30. The article of claim 29 including instructions for causing the router to process the second message using the second key only if the router has not successfully performed the authentication key rollover.

* * * * *